April 5, 1927.  W. J. KUND  1,623,878
TOE-IN GAUGE
Filed Feb. 6, 1926

Inventor
Wendell J. Kund
By Chas. J. Williamson
Attorney

Patented Apr. 5, 1927.

1,623,878

UNITED STATES PATENT OFFICE.

WENDELL J. KUND, OF BEDFORD, PENNSYLVANIA.

TOE-IN GAUGE.

Application filed February 6, 1926. Serial No. 86,491.

The object of my invention is to provide a gauge for measuring or ascertaining or checking the angle of divergence of the front wheels of automobiles or the "toe-in" of such wheels, as it is commonly termed, by a device or gauge in which will be combined extreme simplicity of construction, ease or facility of manipulation, quickness of use, and above all accuracy of measurement. The desirability and value of such a device in view of the importance of conserving wear of the tires will be evident.

My invention consists in whatever is described by or is included within the terms or scope of the appended claims.

Figure 1:
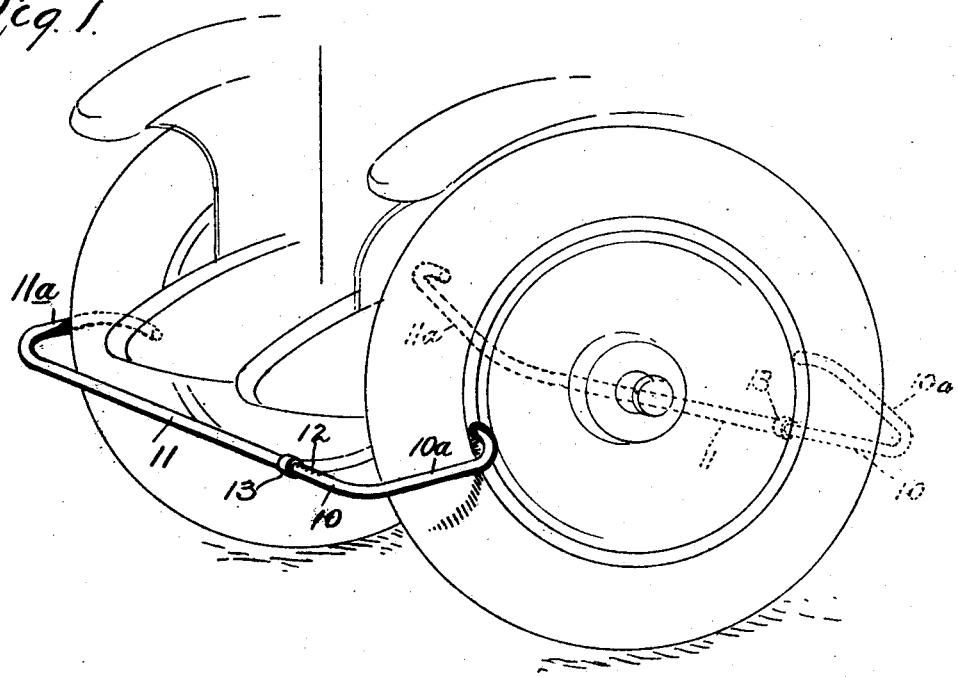
Fig. 1 is a perspective view of a gauge embodying my invention illustrating the manner of use thereof.
Figure 2:
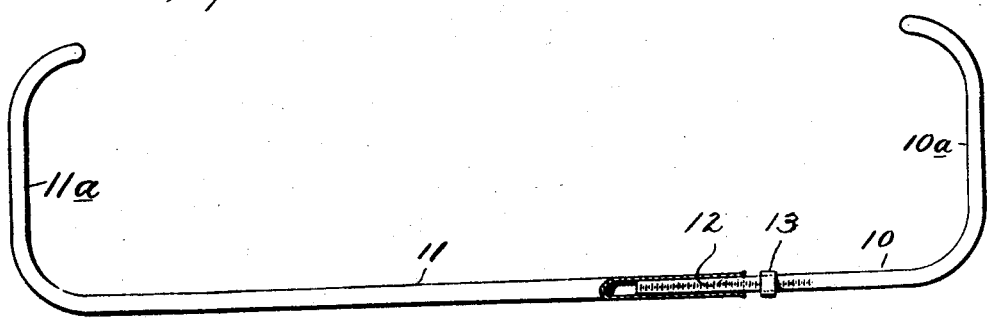
Fig. 2 is a top plan view of the gauge.

The gauge embodying my invention shown in the drawings comprises two rod or bar-like arms of substantially L-shape, each being a tube or made of tubular material, which are telescopically and detachably connected, a straight end portion of the rod, 10, entering the straight end portion of the rod, 11, these two portions in the application of the gauge to the automobile wheels extending horizontally from one front wheel to the other with the short angle arms, 10ª and 11ª, respectively, reaching along the outer side of the respective wheels. Each of said arms, 10ª and 11ª, terminates in a similar inwardly turned extremity which in the measuring operation is placed in contact with the outer side of the wheel felloe, which, of course, lies within a plane within the plane of the outer face of the tire, and for that reason what may be termed the hook-shaped formation at each end of the device is provided, to enable the device to arch or reach around the tire and have contact with the outer side of the wheel felloe. This also constitutes one of the reasons why the two parts of the gauge are slidably connected together, as thereby the gauge is applicable to and removable from the wheels in the measuring operation.

Upon one of the rods or bars, is marked a scale or graduations 12, this being on the bar designated, 10, and on the straight portion thereof which alines with the straight portion of the other bar, 11, and upon said bar with the graduations is a collar, 13, which fits sufficiently close so that though it may readily slide under a slight pressure will nevertheless remain at the point to which it may be slid over the scale or graduations. Said collar, 13, is a marker or index to cooperate with the degrees or graduations of the scale.

In the use of my gauge as will be evident, it is applied, for example, to the front wheels at the rear (see dotted lines Fig. 1) by passing the hook-shaped felloe-engaging extremities over the wheels on the outer side, and sliding the two arms or bars upon one another to place the felloe-engaging extremities in contact with the respective felloes, at a point in a horizontal plane passing through the axis of the wheels and the marker, 13, is placed in contact with the adjacent end of the arm or bar, 11. The graduated arm or bar with the marker is then withdrawn and the reading of the marker is noted and then by a similar operation the gauge is applied to the felloes of the wheels at the front, and of course, the felloe-engaging extremities are placed in contact with the felloes in the horizontal plan passing through the wheel axis, and then the position of the marker, 13, with reference to the scale is noted, and thus, by comparison of the readings the condition of the wheels as to toe-in is checked or ascertained. The arm, 10, having the graduations or scale is preferably shorter than the other arm to facilitate handling in taking the readings.

The hook-shaped form of the arms, enables the gauge when applied to the wheels to clear the crank case, and yet take the measurements from the felloes in the horizontal plane passing through the wheel axis, and it enables the measurements to be taken from the outside of the wheels which is particularly advantageous in the case of disc wheels which by obstructing sight or view of a gauge applied to the inside of the wheels would make inside measuring unsatisfactory.

By making the arms of the gauge of tubular material qualities of lightness and rigidity are secured, and the sliding connection between the arms is obtained.

While I regard the embodiment of my invention shown in the drawings and which I have described in detail, as being what appears to be the best and most satisfactory embodiment of the invention at present, I, of course, do not confine or restrict myself beyond the requirements of my claims which follow, and having reference to the terms or language in which such claims are expressed.

It will be seen that in the embodiment of my invention shown in the drawing, the manipulation in a measuring operation is extremely simple, it not being necessary in the act of measuring to move the marker by hand, because before moving the telescoping arms, 10 and 11, inward, and preparatory to using the gauge, the marker is placed near enough the end of the arm, 10, as to result in its engaging the adjacent end of the arm, 11, when the two arms are moved together in the telescoping action, and thereby and without being touched by the operator the marker is moved along the arm, 10, until the inward telescoping movement of the arms, 10 and 11, ceases from the contact of their hook ends with the felloe sides.

What I claim is:

1. A toe-in gauge comprising arms movably connected which, respectively, have wheel engaging extremities, the movable connection of the arms permitting movement of said extremities towards and from one another, and means to indicate different distances apart of such extremities comprising graduations and an index that consists of a slidable member frictionally engaging one of said arms and movable by pushing contact with the other arm, said frictional engagement retaining said slidable member in whatever position to which it may be slid.

2. A toe-in gauge comprising arms movably connected which, respectively, have wheel engaging extremities, the movable connection of the arms permitting movement of said extremities towards and from one another, and means to indicate different distances apart of such extremities, comprising graduations and an index on one of said arms, consisting of a slidable collar encircling such one of said arms and frictionally engaging the same whereby it will be retained in whatever position to which it may be slid, and said collar being engageable by the adjacent end of the other arm.

3. A toe-in gauge comprising arms telescopically connected which, respectively, have wheel engaging extremities, the movable connection of the arms permitting movement of said extremities towards and from one another, each of said arms being tubular, and being substantially of L-shape, and both having straight portions, the straight portion of one being slidable within the other, and having a frictionally-held slidable collar that forms a marker, said collar being shiftable by contact with the adjacent end of the other arm.

In testimony whereof I hereunto affix my signature.

WENDELL J. KUND.